(12) United States Patent
Scholz

(10) Patent No.: US 7,911,687 B2
(45) Date of Patent: Mar. 22, 2011

(54) SIGHTED DEVICE OPERABLE IN VISIBLE-WAVELENGTH OR ELECTRO-OPTICAL/VISIBLE-WAVELENGTH SIGHTING MODES

(75) Inventor: Robert J. Scholz, Midland (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/197,789

(22) Filed: Aug. 4, 2005

(65) Prior Publication Data

US 2007/0035824 A1 Feb. 15, 2007

(51) Int. Cl.
*G02B 21/12* (2006.01)

(52) U.S. Cl. ........................................ 359/353; 359/399

(58) Field of Classification Search .................. 359/399, 359/353
See application file for complete search history.

(56) References Cited

U.S. PATENT DOCUMENTS

| 5,084,780 | A | * | 1/1992 | Phillips | 359/350 |
| 5,729,010 | A | * | 3/1998 | Pinkus et al. | 250/214 VT |
| 5,864,436 | A | * | 1/1999 | Noyes | 359/785 |
| 2003/0218801 | A1 | * | 11/2003 | Korniski et al. | 359/407 |
| 2006/0164718 | A1 | * | 7/2006 | Tai | 359/353 |

FOREIGN PATENT DOCUMENTS

| DE | 3232092 C1 | 8/1982 |
| EP | 1525505 A | 12/2003 |
| EP | 1549993 A | 12/2003 |
| GB | 2247088 A | 8/1990 |

* cited by examiner

*Primary Examiner* — Joshua L Pritchett
(74) *Attorney, Agent, or Firm* — H. St. Julian, Esq.

(57) ABSTRACT

A sighted device has a sight that includes an objective lens lying on an optical axis of the sight so that an input beam is coincident with the optical axis, an eyepiece lens lying on the optical axis, an imaging detector having a detector output signal, a signal processor that receives the detector output signal from the imaging detector, modifies the detector output signal, and has a processor output signal, and a video display projector that receives the processor output signal and has a video display projector output. An optical beam splitter lies on the optical axis. The beam splitter allows a first split subbeam of the input beam to pass to the eyepiece lens and reflects a second split subbeam of the input beam to the imaging detector. An optical mixer mixes the first split subbeam and the video display projector output prior to the first split subbeam passing through the eyepiece lens.

30 Claims, 3 Drawing Sheets

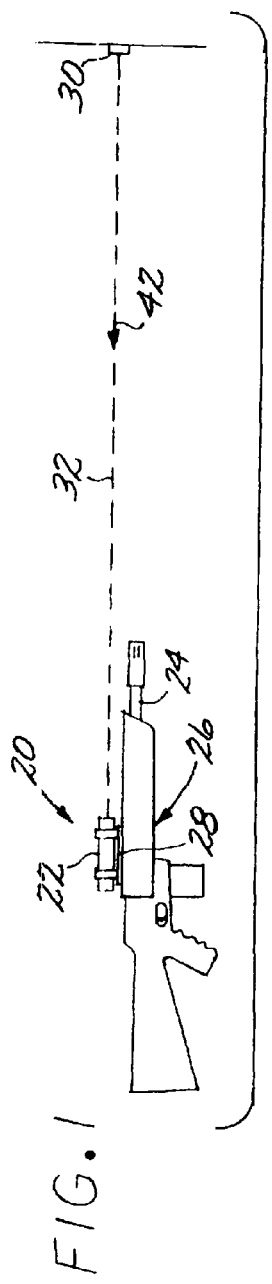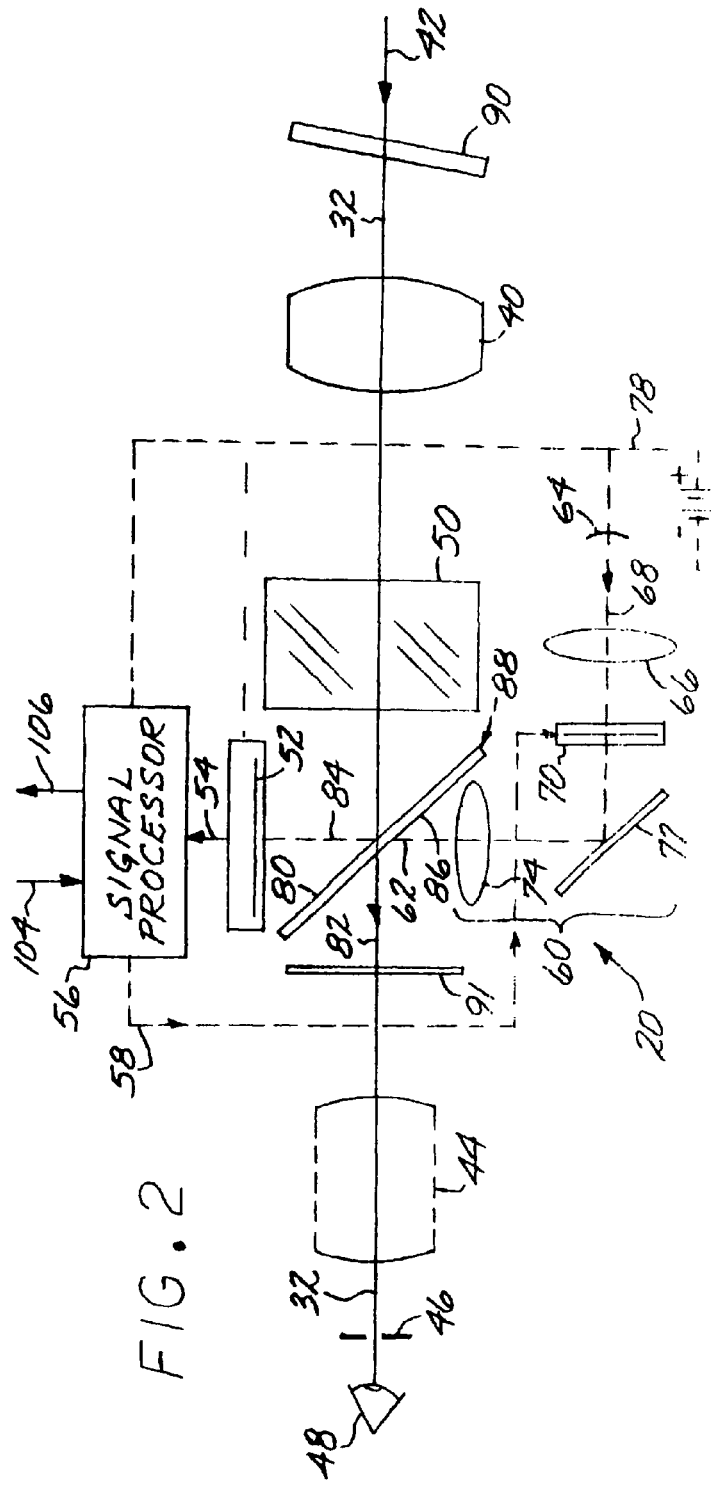
FIG. 1
FIG. 2

SIGHTED DEVICE OPERABLE IN VISIBLE-WAVELENGTH OR ELECTRO-OPTICAL/VISIBLE-WAVELENGTH SIGHTING MODES

This invention relates to a sighted device such as a rifle having a telescopic sight and, more particularly, to such a sighted device that may be operated with either visible-wavelength-only imaging, or in a mixed mode that includes electro-optical and also visible-wavelength imaging.

BACKGROUND OF THE INVENTION

A hand-carried rifle has a sight that aids the user of the rifle in aiming the rifle at the target. In one approach, fixed (sometimes termed "iron") sights are affixed to the upper side of the barrel of the rifle and are aligned to aid the user to point the barrel. The fixed sights operate in the visible wavelength range and at unity magnification.

A rifle may instead be provided with a telescopic sight that magnifies the visible-range image of the target using conventional lenses. The telescopic sight makes it easier to aim the rifle at a distant target because the target is larger when viewed through the telescopic sight. The telescopic sight normally has a reticle structure that permits the telescopic sight to be precisely adjusted to account for distance, windage, and ballistic effects.

The sight may instead function electro-optically, so that the image of the target is formed electronically on a viewing screen. An electro-optical sight allows the image to be electronically adjusted for improved visibility (e.g., contrast enhanced) or electronically enlarged, and also allows the image to be formed with wavelengths other than those in the visible range. For example, an infrared sight converts an image in the infrared range to an image in the visible range for viewing by the human eye. The infrared imaging improves visibility at night and in other viewing conditions where the target is not readily viewed in the visible-wavelength range.

In the work leading to the present approach, the inventor has observed that the available electro-optical sights have the drawback that their functionality is lost in the event of a loss of power or a failure of the electronic circuitry. The user of the rifle is left without a sight, except in the event that the electro-optical sight is entirely removed to leave only fixed, unity-magnification sights (if the rifle is provided with fixed sights). In a critical situation, the loss of the electro-optical sighting capability can effectively render the rifle useless. Additionally, in some circumstances the user may simply elect to employ a conventional telescopic sighting capability in the visible range rather than a sight using electro-optical imaging to obtain the most useful image of the target.

The inventor has thus recognized a need for a sighted device that gives the user a range of options as to the selected sighting approach, as well as a useful fail-safe backup mode of operation in the event of electronic failure. The present invention fulfills this need, and further provides related advantages.

SUMMARY OF THE INVENTION

The present approach provides a sighted device wherein the sight may be operated in either the visible-wavelength range or in a mixed mode that utilizes both electro-optical imaging and visible-wavelength imaging. The user may choose to use only visible-wavelength imaging, or to modify the visible image with electro-optical processing to improve viewability, or to increase wavelength capability such as by using mixed infrared and visible imaging, or to place non-image information in the field of view of the user. In the event that the electronic imaging fails, the backup is visible-wavelength imaging. In each case, the imaging is through an optics-based telescopic sight whose magnification and field of view may be adjusted independently of the selection of the imaging mode. Changing the imaging mode does not cause a significant change in the image magnification and field of view which could cause the user to lose sight of the target. The sighted device may instead be operated in an electro-optical-only mode if the visible image is blocked. The present approach may be used with a sighted weapon such as a rifle, or with other types of sighted devices.

In accordance with the invention, a sighted device has a sight comprising an objective lens lying on an optical axis of the sight so that an input beam is coincident with the optical axis, an eyepiece lens lying on the optical axis, an imaging detector having a detector output signal, a signal processor that receives the detector output signal from the imaging detector, modifies the detector output signal, and has a processor output signal, and a video display projector that receives the processor output signal and has a video display projector output. The sight further includes an optical beam splitter lying on the optical axis, wherein the beam splitter allows a first split subbeam of the input beam to pass to the eyepiece lens and reflects a second split subbeam of the input beam to the imaging detector, and an optical mixer that mixes the first split subbeam and the video display projector output prior to the first split subbeam passing through the eyepiece lens. Desirably, the optical beam splitter and the optical mixer both lie between the objective lens and the eyepiece lens.

The sight may also include other utilitarian and convenience features. For example, the sight may include an eye-safe filter lying on the optical axis that filters selected wavelengths of the input beam or the first split subbeam. There may be a physical reticle assembly lying on the optical axis. Desirably, there is an image-inversion prism system lying on the optical axis between the objective lens and the eyepiece lens so that the user views the target in the upright mode. It is preferred that there is a housing which encloses the objective lens, the eyepiece lens, the imaging detector, the signal processor, the video display projector, the optical beam splitter, and the optical mixer, and an attachment of the housing to a remainder of the sighted device such as the barrel of a rifle.

Most preferably, the beam splitter and the optical mixer are embodied in a single beam splitter/mixer structure. In the usual case where there is an image-inversion prism, it is preferred that the image-inversion prism and the beam splitter/mixer structure are embodied in a single optical structure.

The present approach provides a sighted device in which the sighting mode may be selectively varied between visible-wavelength only or visible-wavelength plus electro-optically modified image of various types, or visible-wavelength plus electro-optical data augmentation, or visible-wavelength plus electro-optically modified image plus electro-optical data augmentation. The user may select the mode that is most suited for a particular situation. For example, the use of electro-optical modification and/or augmentation may be appropriate at times, and in other cases visible-wavelength-only imaging may be fully acceptable and in fact preferred. The eye of the user is continuously held at the eye relief of the sight so that it continuously views through the sight. The user need not look away from the sight to change sighting mode or to obtain other information such as data, maps, and the like. With the present approach, the inoperability of the electro-optical imaging capability, for example due to a lack of power or due to an electronics failure, leaves the user with a fail-safe visible-wavelength sighting capability. (By contrast, in fully electronic sights the failure mode is to no imaging at all, leaving the sight useless.) In all of the modes, the imaging is through the same objective optics and eyepiece optics (and inversion optics in most cases), which is independently controllable.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic elevational view of a sighted device with a sight;

FIG. 2 is a schematic elevational view of a sight according to a first embodiment of the present approach;

DETAILED DESCRIPTION OF THE INVENTION

Figure 3:
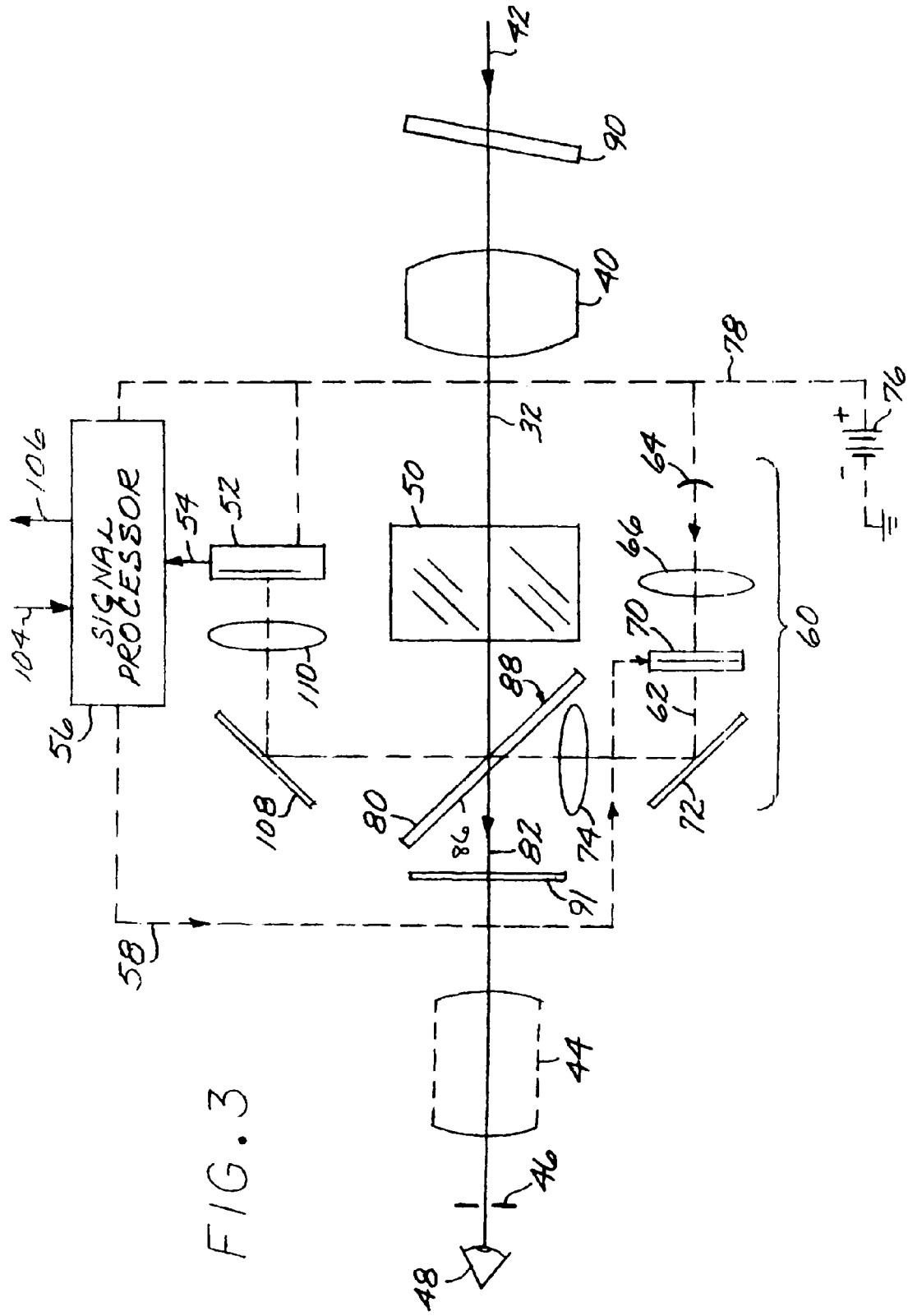
FIG. 3 is a schematic elevational view of a sight according to a second embodiment of the present approach.

FIG. 1 depicts a sight 20 having an elongated, generally cylindrical housing 22. The sight 20 is affixed to a barrel 24 (in this case through the barrel-support) of a rifle (or other aimed device) to form a sighted device 26. There is an adjustable attachment 28 that allows the entire sight 20 to be moved as a unit relative to the remainder of the sighted device 26, in this case relative to the barrel 24, for fine adjustment. The user of the sighted device 26 aims the sighted device 26 and the sight 20 at a distant target 30 along a line of sight, which is also an optical axis 32 of the sight 20. The sight 20 aids the user in aiming the sighted device 26 at the target 30 of interest.

FIG. 2 schematically illustrates the interior components of the sight 20 that are within the housing 22. The sight 20 comprises an objective lens 40 lying on the optical axis 32 of the sight 20 so that an input beam 42 is coincident with the optical axis 32. (Within the interior of the sight 20, the optical axis 32 is depicted as a straight line, but within the sight 20 it may be folded or otherwise altered by prisms or mirrors, as may be needed to achieve the most ergonomic and compact configuration.) Any operable objective lens 40 may be used. The objective lens 40 is schematically represented by a single lens element in the drawing, but it preferably comprises a single-magnification lens group or an adjustable-magnification telescopic lens group. Examples of operable types of objective lenses 40 include achromat doublets, air-spaced triplets, zoom, effective focal length (EFL) switchable, switched, apochromat, and athermalized lens groups, but this list is exemplary and not limiting. The objective lens 40 is designed and coated with consideration for the full capabilities of the sight 20, including both visible wavelengths and non-visible wavelengths such as infrared wavelengths that may be utilized for imaging. Where the objective lens 40 is adjustable, as in the case of a zoom or switched lens, such adjustment is independent of the other visible and the electro-optical functions of the sight 20, so that the objective lens 40 may be adjusted without interfering with these other functions and without the operation of the other functions modifying the magnification and field of view selected for the objective lens 40.

The sight 20 further includes an eyepiece lens 44 lying on the optical axis 32. The eyepiece lens 44 may be of any operable type, such as a monocular or a binocular eyepiece. Two sights 20 with monocular eyepiece lenses 44 may instead be used together to provide a binocular capability. Preferably, an exit pupil is defined by an exit aperture 46 whose opening lies on the optical axis 32. An eye 48 of the user of the sighted device 26 is shown in its normal viewing location at a suitable eye-relief distance behind the eyepiece lens 44.

The objective lens 40 is typically designed so that its output image is inverted relative to that of the target 30 being imaged. To facilitate the viewing of the target 30 by the user, an image-inversion prism 50 may be, and preferably is, provided. The image-inversion prism 50 lies on the optical axis 32 between the objective lens 40 and the eyepiece lens 44. The image-inversion prism 50 may be of any operable type, such as a roof prism or a porro prism.

The sight 20 further comprises an imaging detector 52 having a detector output signal 54. The imaging detector 52 may be of any operable type that converts an incident image into a processable electrical or optical signal, and is preferably a focal-plane-array (FPA) imaging detector. The imaging detector 52 must be operable with the wavelength or wavelength range of interest that is to be processed, for example wavelengths in the visible or infrared wavelength ranges. Examples of some types of operable FPA imaging detectors 52 include a silicon charge-coupled device (CCDs), a CMOS, an intensifier fiber coupled to a CCD, and an InGaAs array. The imaging detector 52 may be located at the objective primary focus as shown in FIG. 2. An alternative arrangement is shown in FIG. 3, which employs an additional fold mirror 108 and a relay lens 110. The relay lens 110 allows the reduction of the image size made by the primary objective to be re-imaged at a secondary focus. The secondary focus enables the use of different FPA array sizes. In the embodiment of FIG. 3, other features common with the embodiment of FIG. 2 are assigned the same reference numerals, and the appropriate description is incorporated here.

A signal processor 56 receives the detector output signal 54 from the imaging detector 52, electro-optically modifies the detector output signal as desired, and has a processor output signal 58. The signal processor 56 is preferably a digital device such as a special purpose computer that produces the processor output signal 58 in digital form. The signal processor 56 can have either or both of two general types of functions for subsequent presentation to the eye 48 of the user as will be subsequently described. First, the signal processor 56 can produce a modified image from the detector output signal 54. For example, the image made be modified by increasing the wavelength range beyond the visible-wavelength range, for example into the infrared by using an infrared imaging detector 52 and processing the detector output signal 54. In another example, the visible image may be modified to highlight or add false coloration to features of interest, modify or shift the color spectrum of the image, suppress features that are not of interest, improve contrast, correct distortion, or the like. Conventional image processing techniques are used for these functions. Second, the signal processor 56 can add non-image information to augment the viewed scene. Information on orders, position and direction, positions of other relevant persons, weapon condition, weather, maps, terrain, and the like may be electro-optically superimposed on the image. The information may be displayed as text or in graphical or other forms, as most appropriate to the clearest presentation. The user may select the mode that is most suited for a particular situation. However, care must be taken that the user is not presented with so much information that there is a distraction from the basic sighting functionality. An additional consideration is that the more information that is to be processed and presented, and the larger the number of pixels of the imaging detector 52 to be processed, the greater is the delay time between the directly viewed image viewed by the user, and the computer-generated-and-displayed image viewed by the user. Such a delay time can be confusing to the user if it is too great, and therefore care is taken not to attempt to display too much information or to do too much processing of the image produced by the imaging detector 52.

Optionally, there may be an external input 104 and an external output 106 for the signal processor 56. The external input 104 may be used to provide images or data from other sources, such as unmanned aerial reconnaissance vehicles, or computer-generated image information, such as an electronically generated reticle, or instructions, such as from a battlefield commander, to the processor output signal 58 provided to the user. The external output 106 may be used to provide the visual information viewed through the sight 20 to an external viewer, such as the battlefield commander or an instructor when the sighed device 26 is used in training.

A video display projector 60 receives the processor output signal 58 and has a video display projector output 62. The video display projector 60 may be of any operable type, but is preferably a digital display device to facilitate the use of the digital signal processor 56. In the embodiment of FIGS. 2 and 3, the video display projector 60 includes a visible-wavelength light source 64 such as a near-monochromatic light-emitting diode (LED) or a polychromatic light source. A condenser lens 66 directs an output beam 68 of the light source 64 through (or onto) an imaging light modulator 70 that is driven by the processor output signal 58. Examples of operable light modulators 70 include liquid crystal displays and micro-mirror units. The output from the light modulator 70, which is the video display projector output 62, is directed by suitable optics, in this case a fold mirror 72 and a projection lens 74. The fold mirror 72 allows the components 64, 66, and 70 to lie on an axis parallel to the optical axis 32 and thereby reduce the overall diametral envelope size of the housing 22.

A power source 76, operating through a power cable 78, supplies power to those components requiring power, including at least the imaging detector 52, the signal processor 56, and the video display projector 60. The power source 76 is preferably a battery.

An optical beam splitter 80 lies on the optical axis 32. The beam splitter 80 allows a first split subbeam 82 of the input beam 42 to pass to the eyepiece lens 44. The beam splitter 80 reflects a second split subbeam 84 of the input beam 42 to the imaging detector 52. The first split subbeam 82 is the portion of the input beam 42 that supplies the largely unmodified visible-wavelength direct image that reaches the eye 48 of the user. There may be modification to the direct image such as wavelength filtration due to coatings on the optical beam splitter 80 and elsewhere in the optical system through which the input beam 42 and the first split subbeam 82 pass. When it reaches the eye 48 of the user, the first split subbeam 82 is coincident with the optical axis 32, allowing the user to align the sight 20 to the target 30 in the normal manner of an optics-only sighting device.

The optical beam splitter 80 may be of any operable type. A beam splitter 80 formed of a multilayer dichroic coating on a transparent substrate is preferred, with the dichroic coating selected to transmit visible wavelengths as the first split subbeam 82 and to reflect wavelengths of interest as the second split subbeam 84. For example, the dichroic coating may be selected to reflect some portions of the visible spectrum, some portions of the infrared spectrum, or both visible and infrared light to the imaging detector 52. With such a dichroic beam splitter 80, there is a color shift in each of the split subbeams 82 and 84. In another example, the optical beam splitter 80 may be a "polka dot" beamsplitter with some areas that are fully transmissive of all wavelengths and some areas that are reflective of all wavelengths. In this case, there is no color shift in the split subbeams 82 and 84, so that the transmitted and reflected images represent the true coloration of the target 30. The selection of the particular spectra of the images of the split subbeams 82 and 84 depends upon the specific application.

An optical mixer 86 mixes the first split subbeam 82 and the video display projector output 62, prior to the point where the first split subbeam 82 passes through the eyepiece lens 44. The video display projector output 62 is the image resulting from the detection, processing, and projection of the second split subbeam 84 as described above. The optical mixer 86 may be conveniently implemented as a di-chroic-coated substrate.

It is preferred to combine the optical beam splitter 80 and the optical mixer 86 in a single, integrated beam splitter/mixer structure 88. In the embodiment of FIG. 2, the beam splitter/mixer structure 88 is a single transparent substrate coated on one side with a di-chroic coating and on the other side with an anti-reflective coating. The optical beam splitter 80 and the optical mixer 86, or the single beam splitter/mixer structure 88, where used, preferably lie between the objective lens 40 and the eyepiece lens 44 on the optical axis 32.

By whatever beam splitter and mixer structures that are used, the present approach allows a portion (the first split subbeam 82) of the input beam 42 to pass directly to the eye 48 of the user. Another portion (the second split subbeam 84) of the input beam 42 is diverted to the imaging detector 52, where it serves as the basis for a modified image that is processed, projected as the video display projector output 62, and ultimately optically mixed back into the directly passed portion 82 of the input beam 42. The mixed optical signal is viewed by the eye 48 of the user. In the event that the image processing electro-optical components 52, 56, and 60 are not fully functioning, the user of the sight 20 still sees the first split subbeam 82 so that the sight 20 retains at least a portion of its functionality.

The present approach may be used in conjunction with other operable structures and features of optical sights. For example, there may be an eye-safe filter 90 lying on the optical axis 32, preferably but not necessarily before the image of the target reaches the optical beam splitter 80. The eye-safe filter 90 filters selected wavelengths of the input beam 42, or the first split subbeam 82 if placed after the image of the target reaches the optical beam splitter 80. The eye-safe filter 90 is selected to filter out wavelengths or intensities that might otherwise be harmful to the eye 48, such as laser wavelengths that might be used by an adversary in an attempt to blind the user of the sighted device 26. In another example, there may be a physical reticle assembly 91 lying on the optical axis 32, preferably near the eyepiece 44. The physical reticle assembly 91 provides an aiming aid, such as a cross hairs, windage gradations, and/or elevation gradations that are used by an experienced marksman to aid in aiming the sighted device 26.

Figure 4:
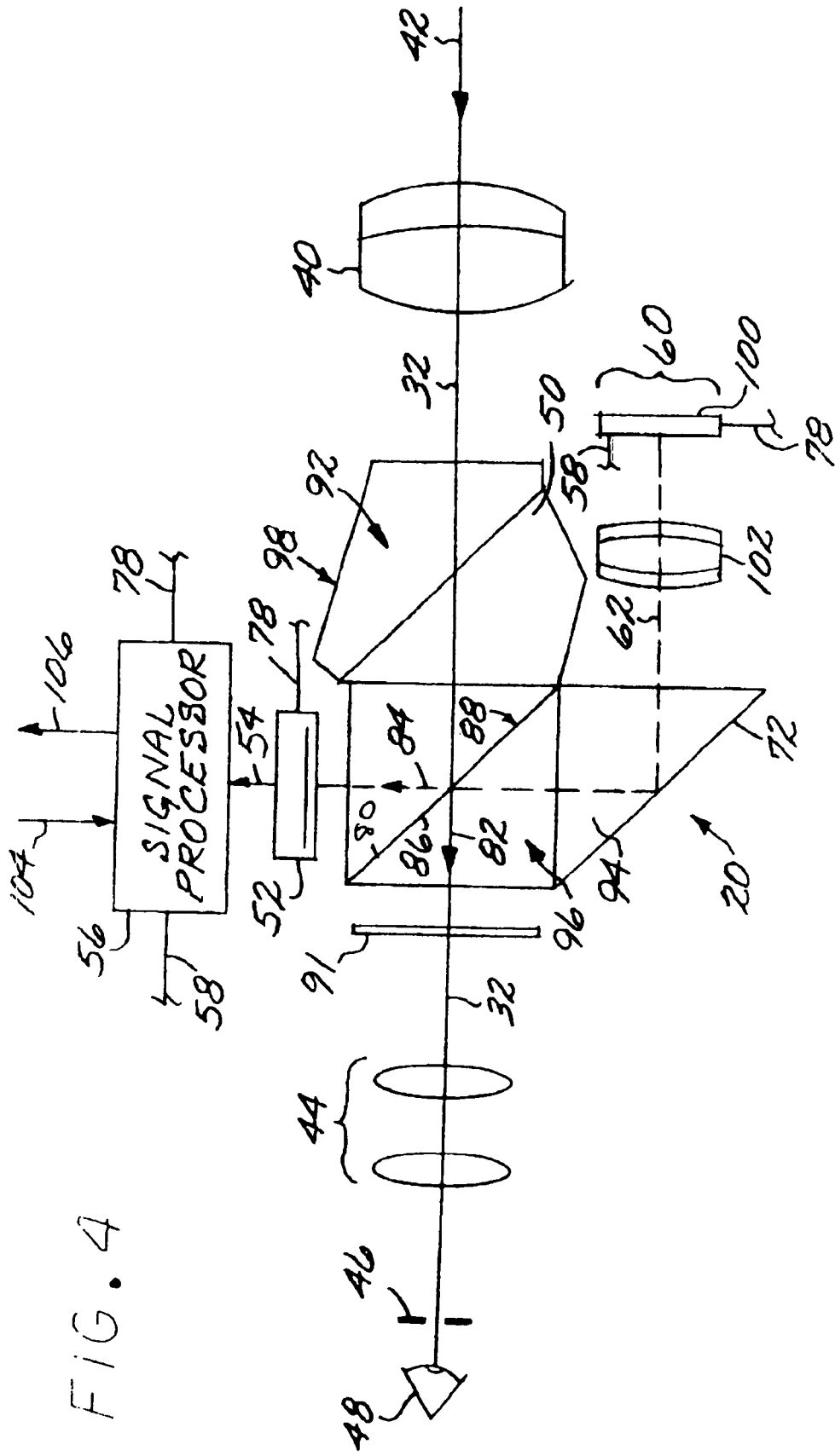
FIG. 4 is a schematic elevational view of a sight according to a third embodiment of the present approach.

FIG. 4 illustrates another embodiment of the present approach of the sight 20. In FIG. 4, features common with FIGS. 1-3 are assigned the same reference numerals, and the prior description is incorporated here. Some features of FIG. 2 are omitted to avoid clutter and because they are optional.

The following discussion will focus on the differences between the embodiments of FIGS. 2 and 4.

In the embodiment of FIG. 2 (and the embodiment of FIG. 3), most optical elements are illustrated in isolation so that their functions may be most readily discussed. However, in practice it is preferred that optical elements be integrated together where possible, as integrated optical structures are more stable and less subject to loss of alignment and degradation of performance in adverse conditions. In the embodiment of FIG. 4, the image-inversion prism 50 is implemented as a Pechan-roof prism 92, the fold mirror 72 is implemented as a fold prism 94, and the beam splitter/mixer structure 88 is implemented as a cube beam splitter/mixer 96. This selection of components has the advantage that the Pechan-roof prism 92, the fold prism 94, and the cube beam splitter/mixer 96 may be bonded together, as with optical cement, to form a single integrated optical structure 98 that performs all of these functions. Once this integrated optical structure 98 is prepared, there is less likelihood of misalignment than where the various components are standalone.

Another difference in the embodiment of FIG. 4 is the use of a back-lit flat panel display 100 in the video display projector 60 to generate the image that becomes the video display projector output 62. A relay lens 102 relays the video display projector output 62 to the cube beam splitter/mixer 96, where it is mixed with the second split subbeam 82 as described previously.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sight for mounting on a weapon, the sight comprising:
a housing for affixing directly to the weapon;
an objective lens system mounted to the housing for receiving a pictorial image of a distant target on an input beam and for establishing an optical axis;
an eyepiece lens system mounted to the housing and located to be adjacent a user's eye in use and aligned on the optical axis;
a single, integrated beam splitter/mixer structure disposed between the objective lens system and the eyepiece lens system in the housing for passing an electronically unprocessed visible image of the target to the eyepiece lens system along the optical axis, for also reflecting the pictorial image of the target away from the optical axis, for optically mixing the passing unprocessed visible image and an electronically processed image of the reflected image, and for outputting the optically mixed images to the eyepiece lens system along the optical axis;
an image detector for receiving the reflected image and for generating a signal responsive to the reflected image;
a signal processor for receiving the signal responsive to the reflected image, for electronically modifying the reflected image and for generating an output signal responsive to the modified reflected image; and
a video display projector for receiving the output signal from the signal processor and for projecting a video display responsive to the signal processor output signal, wherein should there be a failure of the image detector, the signal processor and/or the video display, passing of the unprocessed visible image of the target to the eyepiece lens system along the optical axis remains undisturbed.

2. The sight of claim 1 wherein:
the signal processor receives data external of the housing, the data being received electronically and not optically, and the data generates a second output signal responsive to the external data external of the housing; and
the video display projector receives the second output signal and projects a video display responsive to the signal processor second output.

3. A sight for a weapon, the sight having added capabilities comprising:
a single, integrated beam splitter/mixer structure disposed between an objective lens system and an eyepiece lens system for passing an electronically unprocessed pictorial image of a distant target to the eyepiece lens system, for also reflecting the electronically unprocessed pictorial image of the target, for optically mixing the passing image and a modification of the reflected image, and for outputting the optically mixed images to the eyepiece lens system.

4. The sight of claim 3 including:
an image detector for receiving the reflected image and for generating a signal responsive to the reflected image.

5. The sight of claim 4 including:
a signal processor for receiving the signal responsive to the reflected image, for electronically modifying the reflected image and for generating an output signal responsive to the modified image.

6. The sight of claim 5 including:
a video display projector for receiving the output signal from the signal processor and for projecting a video display responsive to the signal processor output signal.

7. The sight of claim 6 wherein:
the signal processor receives data external of the structure, the data being received electronically and not optically, and the data generates a second output signal responsive to the external data; and
the video display projector receives the second output signal and projects a video display responsive to the signal processor second output signal.

8. A sight for mounting to a weapon, the sight comprising:
a single, integrated beam splitter/mixer structure for passing an electronically unprocessed pictorial image of a distant target to an eyepiece along an optical axis, for also reflecting the unprocessed pictorial image away from the optical axis for processing, for optically mixing the image passed to the eyepiece and an electronically processed image reflected image, and for outputting the mixed images to the eyepiece, and
means for electronically processing the reflected image and outputting processed image back to the integrated beam splitter/mixer structure for said optical mixing,
wherein a failure of the processed image to be formed leaves undisturbed the passing of the electronically unprocessed visible image to the eyepiece along the optical axis for facilitating aiming of the weapon.

9. A method for enhancing a sight for a weapon comprising the steps of:
receiving a pictorial image of a target;
splitting said received pictorial image into a transmitted pictorial image and a reflected pictorial image using a single, integrated beam splitter/mixer structure;
electronically processing the reflected image to produce a processed image;
directing the processed image back to the integrated beam splitter/mixer structure;

optically mixing the processed image and the transmitted image using the integrated beam splitter/mixer structure; and outputting the images from the mixing step to a user.

10. A sight for mounting to a weapon, the sight having electronics to convert non-visible wavelength imaging to visible wavelength imaging, the sight comprising a structure having an objective lens and an eyepiece lens to enable the formation of a linear optical axis and to enable electronically unprocessed visible wavelength imaging of a target to pass from the objective lens to the eyepiece lens along the optical axis;

a single, integrated beam splitter/mixer structure to enable selected wavelengths of pictorial image of the target to be reflected away from the optical axis while visible wavelengths of said image are transmitted along the optical axis toward said eyepiece lens;

a structure to enable the reflected imaging to be electronically processed; and a structure to enable the processed imaging to return to the integrated beam splitter/mixer structure;

wherein said integrated beam splitter/mixer structure also enables the processed reflected imaging and the passed imaging to be optically mixed and the mixed imaging to pass to the eyepiece lens along the optical axis, wherein a loss of power to the electronics and/or the failure of the electronics leave undisturbed the passing of the unprocessed visible wavelength imaging from the objective lens to the eyepiece lens for facilitating aiming of the weapon.

11. The sight of claim 10 wherein the structure to enable the reflected imaging to be electronically processed includes an image detector, a signal processor and a video display projector.

12. The sight of claim 10 wherein:

the structure to enable the processed imaging to return to the optical axis is unaffected by a failure of the processed visible image to be returned to the optical axis.

13. The sight of claim 10 wherein:

the integrated beam splitter/mixer structure is unaffected by a failure of the imaging to be mixed.

14. The sight of claim 10 including:

structure to enable receipt of external electronic, and not optical, data to enable additional information to be passed to the eyepiece lens.

15. A method for enhancing a sight for a weapon, the sight having electronics in a fail-safe arrangement comprising the steps of:

constructing a first structure having an objective lens and an eyepiece lens and a linear optical axis between the objective lens and the eyepiece lens, and being enabled to pass electronically unprocessed imaging;

placing a single integrated beam splitter/mixer structure in the first structure to enable reflection of selected wavelengths of the unprocessed imaging while transmitting visible wavelengths unprocessed imaging;

providing a second structure to enable electronic processing of the reflected imaging and returning the processed imaging to the integrated beam splitter/mixer structure;

enabling the use of the integrated beam splitter/mixer structure to optically mix the unprocessed and the processed imaging; and enabling the use of the integrated beam splitter/mixer structure to pass the mixed imaging to the eyepiece lens, wherein a lack of power and/or an electronics failure has no affect on the first structure's ability to pass the electronically unprocessed visible wavelength imaging.

16. The method of claim 15 including the step of:

maintaining the passing of the electronically unprocessed visible wavelength imaging upon a failure of the integrated beam splitter/mixer structure to optically mix the imaging.

17. An imaging system comprising:

an input aperture;

an output aperture;

first means disposed in a linear optical path between said input aperture and said output aperture for receiving pictorial image of a target;

a single, integrated beam splitter/mixer structure disposed in said optical path for splitting said received pictorial image into a transmitted pictorial image and a reflected pictorial image and for also optically mixing said transmitted image with a modified version of said reflected image to provide an optically mixed image to said output aperture; and second means for electronically processing said reflected image to produce said modified image.

18. The invention of claim 17 wherein said second means includes a focal plane army.

19. The invention of claim 18 further including video electronics coupled to said focal plane array.

20. The invention of claim 19 further including an image display projection device coupled to said video electronics for providing said modified image to said integrated beam splitter/mixer structure.

21. The invention of claim 17 wherein said first means is a telescope objective.

22. The invention of claim 21 further including an eye safe filter disposed in alignment with said telescope.

23. The invention of claim 21 further including image erection optics.

24. The invention of claim 17 wherein said second means includes means for shifting a wavelength of an image sensed via said input aperture.

25. The invention of claim 24 wherein said second means includes means for shifting wavelengths of multiple spectral bands in said image.

26. The invention of claim 17 wherein said second means includes means for superimposing symbols on an image viewed via said output aperture.

27. The invention of claim 17 wherein said integrated beam splitter/mixer structure is adapted to transmit visible wavelengths and reflect infrared wavelengths.

28. The invention of claim 17 wherein said integrated beam splitter/mixer structure is a cube beam splitter/mixer.

29. The invention of claim 28 further including an image inversion prism bonded to a first side of said cube beam splitter/mixer for coupling an inverted version of said received pictorial image to said cube beam splitter/mixer for said splitting.

30. The invention of claim 29 further including a fold prism bonded to a second side of said cube beam splitter/mixer for coupling said modified image to said cube beam splitter/mixer for said optical mixing.

* * * * *